Feb. 19, 1929.
R. C. YEPSEN
1,702,884
CONVEYER DOG
Filed Jan. 31, 1927
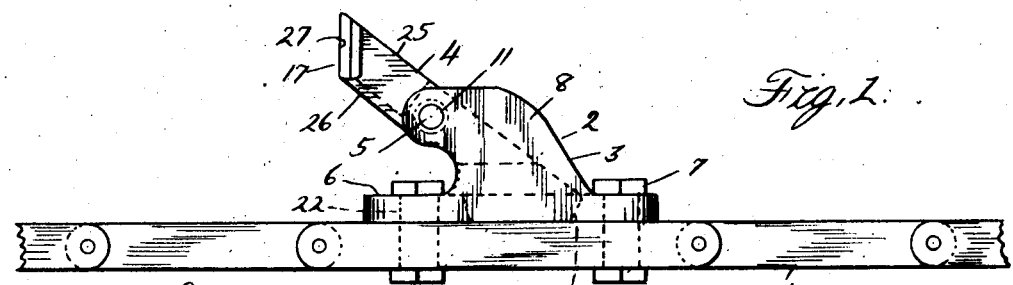
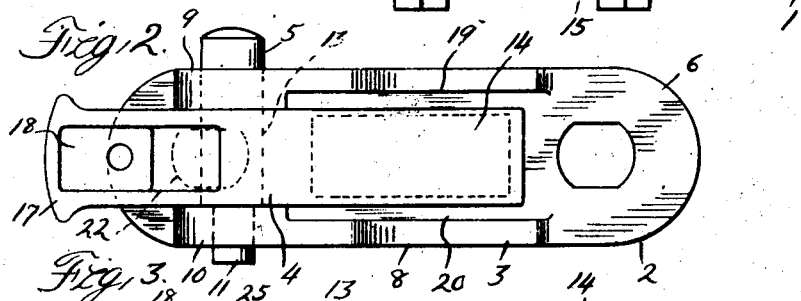
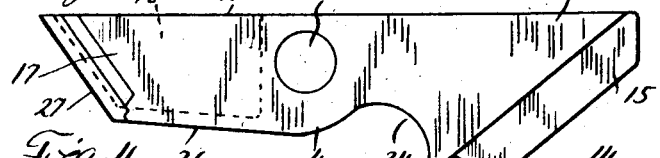
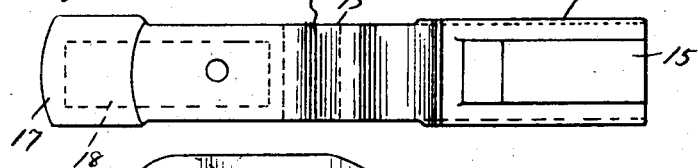
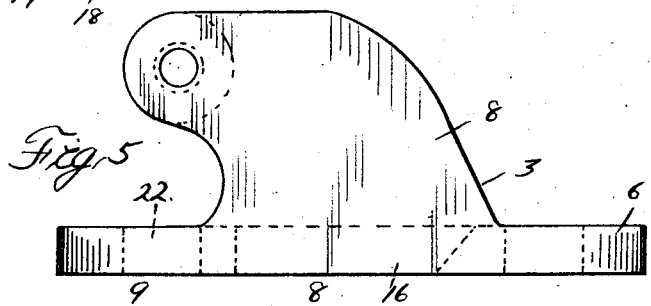
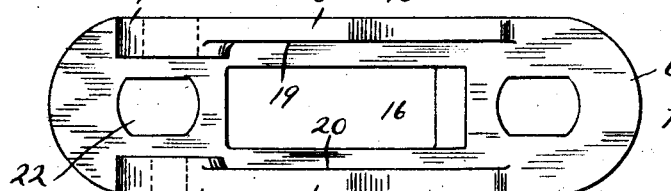
Inventor
Ray C. Yepsen
By Whittemore Hulbert Whittemore
& Belknap
Attorney Patented Feb. 19, 1929.

1,702,884

UNITED STATES PATENT OFFICE.

RAY C. YEPSEN, OF DETROIT, MICHIGAN, ASSIGNOR TO BRIGGS MANUFACTURING COMPANY, OF DETROIT, MICHIGAN, A CORPORATION OF MICHIGAN.

CONVEYER DOG.

Application filed January 31, 1927. Serial No. 164,915.

This invention relates generally to conveyer dogs and consists of certain novel features of construction, combinations and arrangements of parts as will be hereinafter more fully described and particularly pointed out in the appended claim.

In the accompanying drawing:

Figure 1 is a fragmentary side elevation of a conveyer with a dog embodying my invention applied thereto.

Figure 2 is a top plan view of the dog.

Figure 3 is a detail elevation of the rocker.

Figure 4 is a top plan view of the rocker.

Figure 5 is a detail elevation of the bracket.

Figure 6 is a top plan view of the bracket.

Figure 7 is an end view of the bracket.

Figure 8 is a detail view of the pivot pin.

In the past, conveyers have been provided at spaced points longitudinally thereof with upstanding pins or projections for maintaining articles of various kinds in proper spaced relation upon such conveyers while being moved thereby. For instance in certain vehicle body manufacturing plants or factories, conveyers for vehicle bodies have been provided with such pins for maintaining the body carrying trucks in the desired position upon the conveyers while in transit. However with such constructions, the trucks had to be lifted up over the pins to mount the trucks upon or remove them from, or to advance them or move them back upon the conveyers. In practice such adjustment of the trucks relative to the conveyers consumed considerable time and labor and therefore has proven very objectionable.

With the present invention the conveyer is provided with self acting dogs or stops that permit the trucks to be mounted upon or advanced upon such conveyers without the necessity of lifting the trucks as previously described.

Referring now to the drawing, 1 is a section of a conveyer, and 2 is a dog embodying my invention carried thereby. As shown, the dog comprises only three parts, namely, a bracket 3, a rocker 4, and a pivot pin 5. Preferably the bracket 3 has a substantially flat base 6 that is secured by suitable headed elements such as the bolts 7 to the conveyer 1, and is provided intermediate of its ends with an upstanding bifurcated lug 8 for supporting the pivot pin 5 and rocker 4. In the present instance the pin 5 extends through the furcation 9 to the furcation 10 and has a reduced portion 11 that extends through the furcation 10, while the rocker 4 is located between the furcations 9 and 10 and is provided intermediate of its ends with a transversely extending bore 13 that receives the pin 5. With this construction the portion 14 of the rocker in rear of the pivot is solid and is preferably provided at its rear end with an elongated solid projection 15 that extends longitudinally of the said rear end and is normally received in an opening 16 of somewhat similar shape in the base 6 of the bracket. If desired, the opening 16 and the projection 15 may be so proportioned, one to the other that the rear end of the projection 15 will abut the rear end of the opening 16 when the rocker is in normal operative position as shown in Figure 1. As a result the strains and stresses imparted by the body supporting truck to the rocker may be taken up by the base 6 through engagement of the projection 15 therewith and will thereby relieve the pivot pin 13 of such stresess. The portion 17 of the rocker in advance of the pivot 13 is recessed as shown at 18 for lightness, hence the rocker is weighted at its rear end and will normally assume the position shown in Figure 1.

To expedite the attachment of the bracket 3 to the conveyer 1, the forward edges of the furcations 9 and 10 of the lug are recessed as shown at 19 and 20 respectively. Thus, the bolt 7 or other suitable securing element may be readily inserted in the forward opening 22 in the base for engagement with the conveyer 1. Moreover these recesses 19 and 20 are so arranged that the furcations may be used directly as stops when for instance the frames of the body supporting trucks or other carriers are lower than usual. In this connection it will be noted that the forward lower edge of the rocker is also recessed as shown at 24 corresponding to the recesses 19 and 20, hence the frames of such carriers may engage the furcations 9 and 10 without effecting the rocker 4. The upper and lower edges 25 and 26 respectively of the portion 17 of the rocker are preferably parallel, while the extreme forward end of said portion 17 is bevelled downwardly as shown at 27 so that the proper engagement between the carrier and rocker may be readily obtained.

Thus, from the foregoing description, it will be readily apparent that I have provided a strong and durable dog that is simple in construction and can be manufactured at a comparatively low cost. Such dogs may be easily and quickly secured to a suitable conveyer and when so applied will function automatically for accomplishing the results desired.

While its is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention:

In a conveyer attachment, a base having an upstanding ear, and a dog pivoted intermediate the ends thereof to the ear and having a rear portion reduced to define a shoulder engaging the base to limit pivotal movement of the dog, said base being provided with a slot receiving the reduced portion of said dog, one wall of said slot being engaged by the opposed edge of said reduced portion to receive the thrust on the dog.

In testimony whereof I affix my signature.

RAY C. YEPSEN.